United States Patent [19]

Chang

[11] Patent Number: 4,721,025
[45] Date of Patent: Jan. 26, 1988

[54] EQUILIBRIUM APPARATUS OF CUT-OFF MECHANISM FOR HIGH-SPEED NUT FORMER

[76] Inventor: Yun-Te Chang, No. 172, Erh-Hang Tsun, Jen-Te Hsiang, Tainan Hsien, Taiwan

[21] Appl. No.: 38,790

[22] Filed: Apr. 15, 1987

[51] Int. Cl.$^4$ .................. B26D 5/08; B26D 7/00; B21D 53/24
[52] U.S. Cl. .................. 83/615; 10/72 R; 83/748
[58] Field of Search .................. 10/72 R, 76 R, 86 F; 83/615, 748

[56] References Cited

U.S. PATENT DOCUMENTS

| | | | |
|---|---|---|---|
| 2,440,848 | 5/1948 | Conner | 83/615 X |
| 3,030,642 | 4/1962 | Fray | 83/615 X |
| 3,589,278 | 6/1971 | Brauer et al. | 83/615 X |
| 3,610,083 | 10/1971 | Yasuda et al. | 83/615 X |

*Primary Examiner*—E. Michael Combs
*Attorney, Agent, or Firm*—Cushman, Darby & Cushman

[57] ABSTRACT

An equilibrium apparatus of cut-off mechanism for high-speed nut former which includes a cutting unit carrying a cutting tool thereon, and a counterweight unit carrying a counterweight unit thereon. The cutting unit and the counterweight unit are connected pivotally to a coupling unit which is fixed on the machine table of the nut former at the central portion thereof so that the cutting unit and counterweight unit are capable of effecting straight motion. A push plate is drivable to move in a first direction so as to push the cutting unit and the counterweight unit to move in a second direction perpendicular to the first direction in such a manner that only one of the cutting unit and the counterweight unit is pushed. A spring device is disposed on the cutting unit and the counterweight unit for absorbing the shock produced from the cutting action of the cutting tool and for biasing the cutting unit and the counterweight unit to move in a third direction which is opposite to the second direction. The cutting unit and the counterweight unit are always moved in opposite directions so that the equilibrium of the cut-off mechanism is achieved.

2 Claims, 10 Drawing Figures

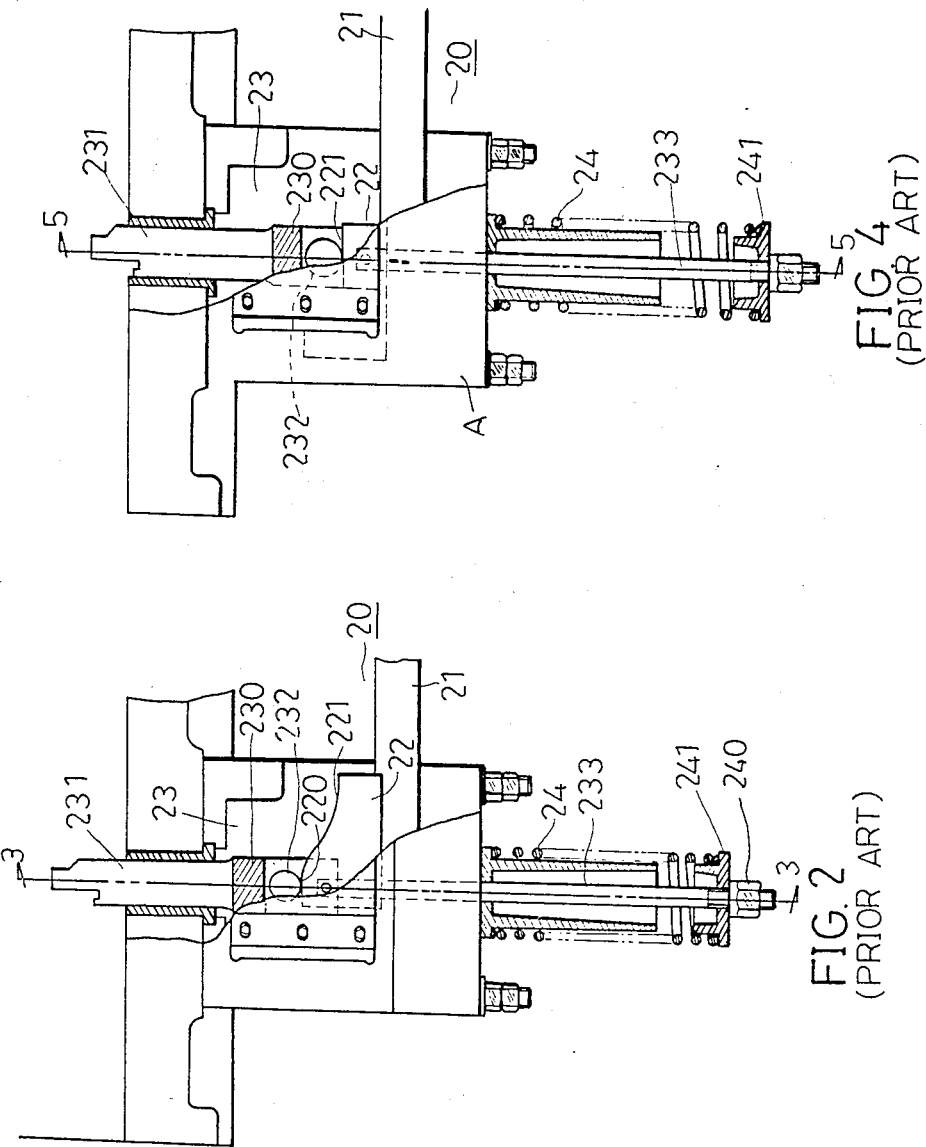

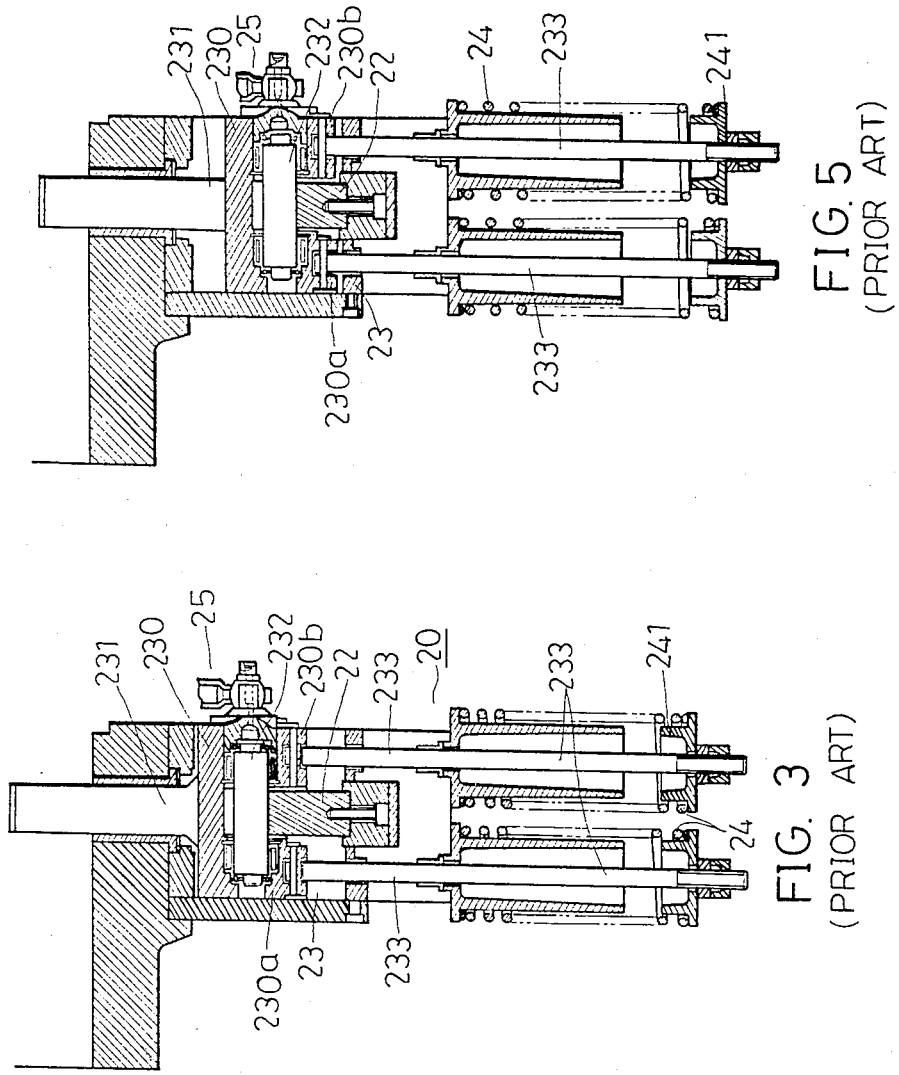

EQUILIBRIUM APPARATUS OF CUT-OFF
MECHANISM FOR HIGH-SPEED NUT FORMER

BACKGROUND OF THE INVENTION

The present invention relates to an equilibrium apparatus of cut-off mechanism for high-speed nut former, and more particularly to one which can promote the stability of the cut-off mechanism so as to increase the cutting speed thereof.

Generally, a conventional nut former, as shown in FIG. 1 which is a schematic top view thereof, includes a power mechanism 10 such as an electric motor which serves as a power source; a crank shaft 11 drivable by the power mechanism 10 to rotate; a punch rod 12 drivable by the intermediate crank arm to operate; a punch plate 13 connected movably to the punch rod 12 so that it can be driven by the punch rod 12 to effect straight reciprocating motion of pressure stamping; an end crank arm 14 with a crank pin connected pivotally to a connecting rod 15; and a cut-off mechanism 20 including a slide plate 21 connected movably to the connecting rod 15 so as to effect horizontal straight reciprocating motion. The horizontal straight reciprocating motion of the slide plate 21 causes the cutting tool (not shown) to effect vertical straight reciprocating motion, to thus cut a steel wire extending from a winch 16 into steel masses to be pressure stamped.

FIG. 2 is a schematic top elevational detail view of the conventional cut-off mechanism. FIG. 3 is a sectional view taken along the line 3—3 of FIG. 2.

Referring to FIGS. 2 and 3, the conventional cut-off mechanism 20 includes:

a push plate 22 connected securely to the slide plate 21 and having a push surface which has a convex portion 220 and a concave portion 221;

a cutting unit 23 including a driven piece 230 having two projections 230a and 230b forming a gap therebetween opposite the push surface of the push plate 22, a cutting tool connecting rod 231 secured to the driven piece 230, a roller 232 mounted movably on the driven piece 230 within the gap and always abutting on the push surface of the push plate 22, and two extension rods 233 respectively extending from the projections 230a and 230b; and a pair of compression springs 24 disposed on the outer end portions of the extension rods 233 between the machine table A and rings 241 which are positioned by nuts 240 screwed to the extension rods 233.

In addition, a clamp 25 is integral with the driven piece 230 in order for clamping the nuts. Since the clamp 25 is not the improvement of the present invention, more detailed description will be omitted for the purpose of simplicity.

In use, when the roller 232 is moved onto the convex portion 220 of the push surface, the driven piece 230 is pushed upwardly. Thus, the cutting tool cuts the steel wire off, while the rings 241 compress the compression springs 24.

Subsequently, when the roller 232 is moved onto the concave portion 221 of the push surface, the driven piece 230 moves back to its lowermost position. Thus, the compression spring 24 is restored to its uncompressed condition, and the cutting tool moves away from the steel wire.

It has been understood that the conventional cut-off mechanism 20 generally suffers from the following disadvantages:

(1) Poor stability. Since the driven piece 230, the cutting tool and its connecting rod 231, and the extension rods 233 are simultaneously moved at a relatively high speed in a single direction, the entire machine table A will be subjected to serious shock which will ultimately affect the cutting operation of the steel wire.

(2) High rate of malfunction. The speed of the extension rods 233 is relatively high, so the elasticity of the compression springs 24 is easily fatigued. Also, the serious shock suffered by the machine table A frequently causes the parts of the mechanism to malfunction.

(3) Low production rate. To ensure the quality of the product and the long lifetime of the cut-off mechanism, the cutting speed of the cut-off mechanism must be reduced.

(4) Excessive use of power. Since the push plate 22 must bear the weight of the roller 232, the driven piece 230, the extension rods 232, and the restoring force of the compression springs 24, a great deal of power is necessary. The manufacturing cost is thus increased.

(5) Difficult to test. In inching test, it is necessary for the push plate 22 to bear both the shearing force of cutting the steel wire off and the restoring force of the compression springs 24.

SUMMARY OF THE INVENTION

It is therefore the main object of the present invention to provide an equilibrium apparatus of cut-off mechanism for high-speed nut former which can be operated at a high speed so as to decrease the manufacturing cost.

It is therefore the main feature of the present invention to provide a counterweight in a cut-off mechanism for high-speed nut former in which the cutting tool and the counterweight are forever moved in opposite directions to achieve the equilibrium of the cut-off mechanism in operation.

According to the present invention, the equilibrium apparatus of cut-off mechanism for high-speed nut former includes a cutting unit carrying a cutting tool thereon, a counterweight unit carrying a counterweight thereon, a push plate drivable to effect straight reciprocating motion in a first direction and having a push surface for pushing the cutting unit and the counterweight unit to move in a second direction perpendicular to the first direction in such a manner that only one of the cutting unit and the counterweight unit is pushed at a time, a coupler mounted pivotally on the machine table of the nut former at the central portion thereof so that it can rotate about its pivoted point to movably interconnect the cutting unit and the counterweight unit at the opposite ends thereof in such a manner that the cutting unit and the counterweight unit are capable of effecting straight motion, and a spring device for absorbing the shock produced from the cutting action of the cutting tool and for biasing the cutting unit and the counterweight unit to move in a third direction which is opposite to the second direction.

When one of the cutting unit and the counterweight unit is pushed by the push plate to move in the second direction, the other of the cutting unit and the counterweight unit is moved stably in the third direction. Accordingly, the cutting unit and the counterweight unit are always pushed to effect straight reciprocating motion in opposite directions so that the speed nut former includes a cutting unit carrying a cutting tool thereon, a counterweight unit carrying a counterweight thereon, a push plate drivable to effect straight reciprocating motion in a first direction and having a push surface for pushing the cutting unit and the counterweight unit to move in a second direction perpendicular to the first direction in such a manner that only one of the cutting unit and the counterweight unit is pushed at a time, a coupler mounted pivotally on the machine table of the nut former at the central portion thereof so that it can rotate about its pivoted point to movably interconnect the cutting unit and the counterweight unit at the opposite ends thereof in such a manner that the cutting unit and the counterweight unit are capable of effecting straight motion, and a spring device for absorbing the shock produced from the cutting action of the cutting tool and for biasing the cutting unit and the counterweight unit to move in a third direction which is opposite to the second direction.

When one of the cutting unit and the counterweight unit is pushed by the push plate to move in the second direction, the other of the cutting unit and the counterweight unit is moved stably in the third direction. Accordingly, the cutting unit and the counterweight unit are always pushed to effect straight reciprocating motion in opposite directions so that the equilibrium of the cut-off mechanism is achieved, thereby permitting the cut-off mechanism to be operated at a high speed.

BRIEF DESCRIPTION OF THE DRAWINGS

Other features and advantages of the present invention will become apparent from the following detailed description of a preferred embodiment of the present invention with reference to the accompanying drawings in which:

FIG. 2 is a schematic top view showing the cut-off mechanism of the conventional nut former;

FIG. 3 is a sectional view taken along the line 3—3 of FIG. 2;

FIGS. 4 and 5 are schematic views illustrating the operation of the conventional cut-off mechanism;

DETAILED DESCRIPTION OF THE PREFERRED EMBODIMENT

Figure 6:
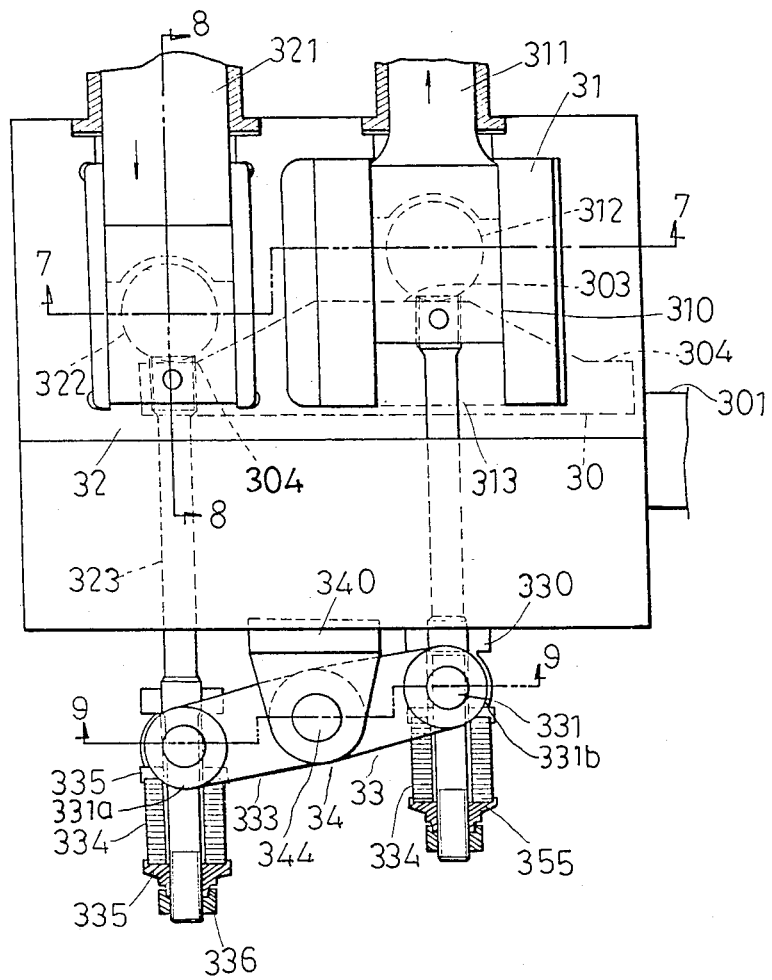
FIG. 6 is a schematic top view of an equilibrium apparatus of cut-off mechanism for high-speed nut former according to the present invention.

Referring first to FIG. 6, there is shown an equilibrium apparatus of cut-off mechanism for high-speed nut former. The equilibrium apparatus includes a push plate 30, a cutting unit 31, a counterweight unit 32, four coupling units 33, and a fulcrum unit 34.

The push plate 30 is connected securely to an electrically driven slide plate 301 in a known manner. Provided on the push plate 30 is a push surface which consists of a higher planar portion 303 at the intermediate portion thereof and two lower planar portions 304 on the opposite sides of the higher planar portion 303.

Figure 7:
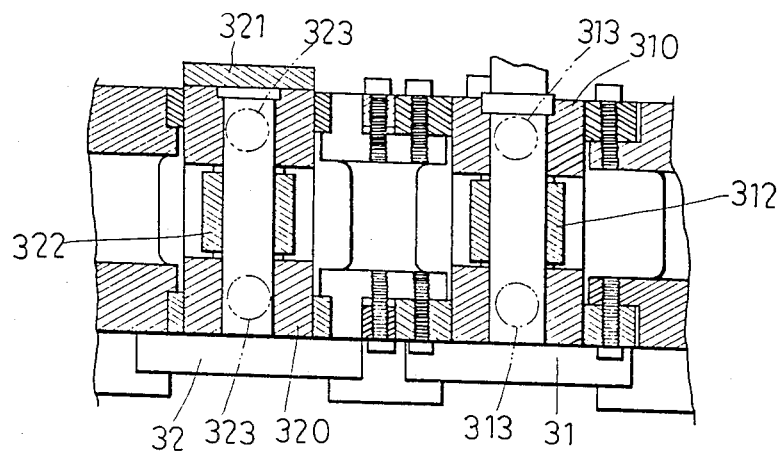
FIG. 7 is a sectional view taken along the line 7—7 of FIG. 6.

The cutting unit 31, as shown in FIG. 6 with reference to FIG. 7, is of a known structure. It includes a first driven piece 310 on which a cutting tool connecting rod 311 is fixed. The first driven piece 310 is provided with two aligned projections forming a generally U-shaped body having a first gap in which a first roller 312 is always abutting the push surface of the push plate 30 and is mounted rotatably. Each of the projections is connected securely to a first extension rod 313 extending out of the machine table.

Figure 8:
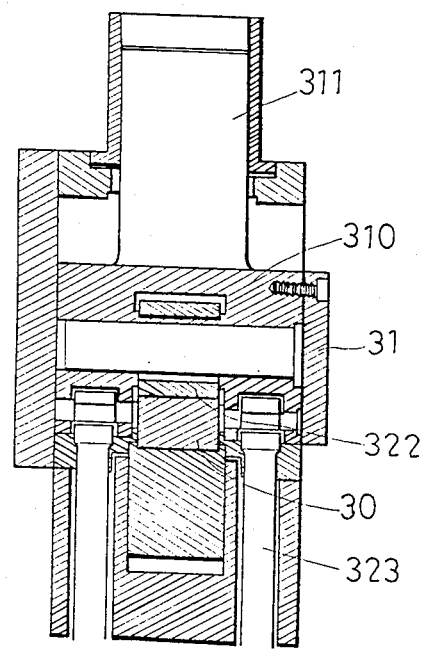
FIG. 8 is a sectional view taken along the line 8—8 of FIG. 6.

The counterweight unit 32, as shown in FIG. 6 with reference to FIGS. 7 and 8, is located parallel to the cutting unit 31. It includes a second driven piece 320 carrying a counterweight 321 fixed thereon. In a manner identical to that of the cutting unit 31, the counterweight unit 32 further includes a second roller 322 mounted rotatably on the second driven piece 320 within a second gap and always abutting the push surface of the push plate 30, and a pair of second extension rods 323 connected securely to the two projections of the second driven piece 320 and extending out of the machine table.

Figure 1:
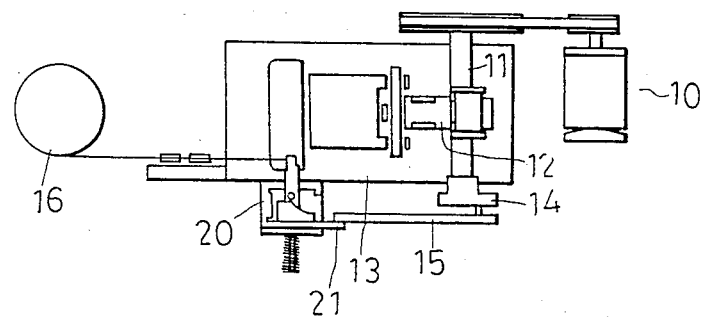
FIG. 1 is a schematic top view of a nut former according to prior art.
Figure 9:
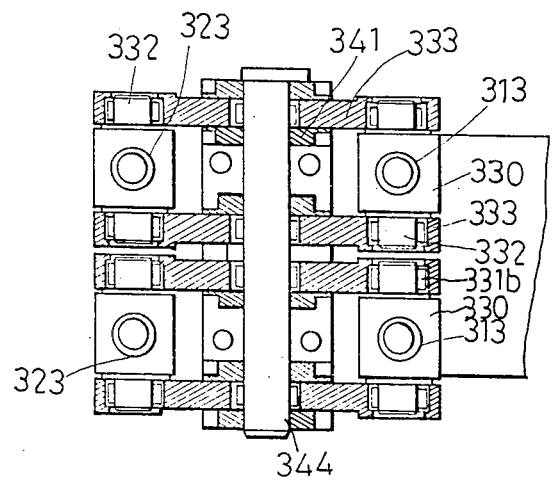
FIG. 9 is a sectional view taken along the line 9—9 of FIG. 6.

Each of the coupling units 33, as shown in FIG. 6 with reference to FIG. 9, includes a rectangular positioning plate 330 having a central hole for sleeving on one of the first extension rods 313 and second extension rods 323, a cross wheel shaft 331 carrying a pair of wheels 331a of increased diameter at the opposite ends thereof and having a central hole through which one of the first extension rods 313 and the second extension rods 323 is inserted, a pair of couplers 333 connected pivotally to the opposite end portions 332 of the wheel shaft 331, and a laminated spring 334 installed on one of the first extension rods 313 and the second extension rods 323 by a ring 335 and a nut 336. Each of the wheel shafts 331 is journalled by a pair of bearings 331b at the end portions 332 thereof. Furthermore, a circular gap (see FIG. 9) is left between the end portion 332 and the coupler 333 so that the first extension rods 313 and the second extension rods 323 are capable of effecting straight motion along the length thereof. The positioning plates 330 and the wheel shafts 331 are compressed by the laminated springs 334 so that they are positioned on the extension rods 313 and 323. Each of the couplers 333 interconnects one of the first extension rods 313 and one of the second extension rods 323 at the opposite ends thereof. The number of the couplers 333 is four all together, as illustrated. The fulcrum unit 34 includes a base 340 secured to the machine table. The base 340 has four channels 341 for the couplers 333 each of which has a central hole. Mounted on the center of the base 340 is a pivot shaft 344 for inserting through the central holes of the couplers 333 so as to form as a central fulcrum of the couplers 333.

It is noted that the first and second rollers 312 and 322 are located so that when the first roller 312 abuts on the higher planar portion 303 of the push surface, the second roller 322 abuts on the lower planar portion 304 of the push surface, as shown in FIG. 6, and vice versa, as shown in FIG. 9.

Figure 10:
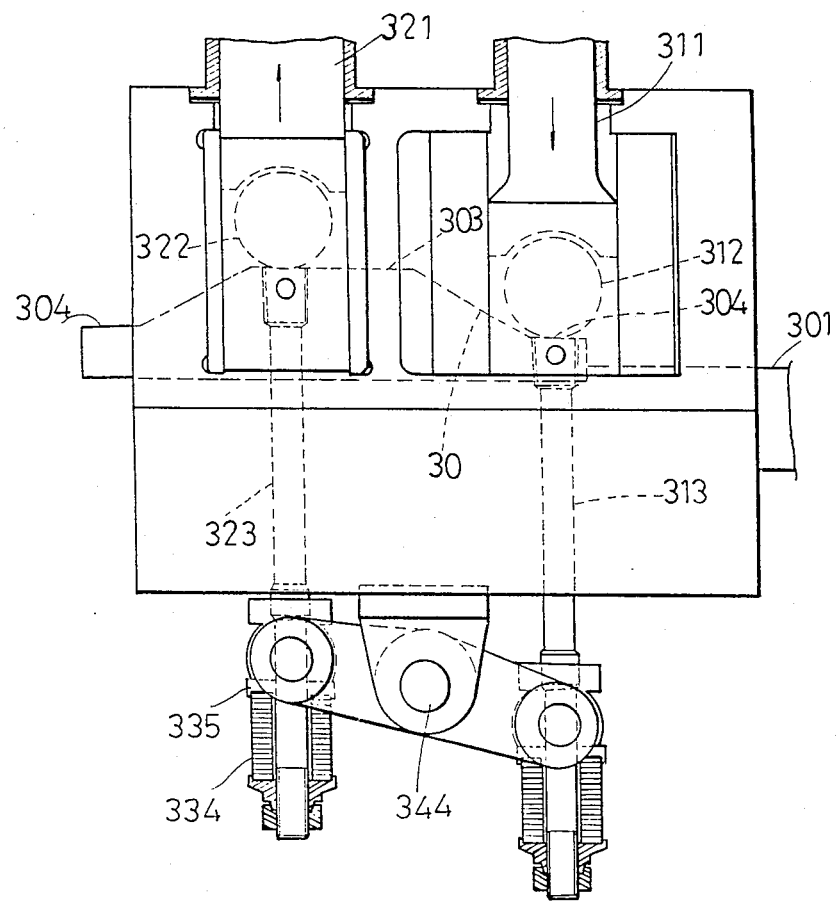
FIG. 10 is a schematic view illustrating the operation of the equilibrium apparatus of cut-off mechanism for high-speed nut former according to the present invention.

Referring to FIGS. 6 and 10, in operation, when the slide plate 301 and hence the push plate 30 are moved back so that the first roller 312 abuts on the higher planar portion 303 of the push plate 30, as shown in FIG. 6, the cutting tool is pushed upwardly to cut the steel wire off. Additionally, the first extension rod 313 is also moved so that the laminated spring 334 is somewhat compressed, as illustrated. When the first roller 312 abuts with the higher planar portion 303 of the push surface, the second roller 322 and the second driven piece 320 are moved downwardly along with the second extension rod 323 due to the restoring force of the laminated spring 334 and to the coupling action of the coupler 333 so that the second roller 322 abuts with the lower planar portion 304 of the push surface. It is thus understood that the cutting unit 31 and the counterweight unit 32 are always moved in opposite directions. This reduces the shock suffered by the machine table rendering a stable operating condition. Furthermore, it is difficult for the elasticity of the laminated spring 334 to become fatigued because the restoration force required is relatively small.

Therefore, when the push plate 30 is moved forward, referring to FIG. 10, the second roller 322 is moved upwardly onto the higher planar portion 303. To counterbalance this motion, the laminated spring 334 and the coupler 333 pull the first roller 312 downwardly, thereby moving the cutting tool away from the steel wire. Accordingly, the equilibrium of the cut-off mechanism is forever maintained.

As explained in the foregoing, the above-mentioned desired object of the present invention can be obtained.

Alternatively, for further promoting the effect of the equilibrium, the interconnecting slide plate 301 and push plate 30 may be also designed to move in opposite directions. Also, the number of counterweights may be increased and disposed in a manner so that each unit is symmetrically located with respect to the cutting unit 31.

As a modification to the form of the push surface, the position of both the lower planar portion 304 and the higher planar portion 303 may be interchangeable so that the first roller 312 is located on one of them when the second roller 322 is located on the other of them.

With the present invention thus explained, it is apparent that various modifications and variations can be made without departing from the scope and spirit of the present invention. It is therefore intended that the present invention be limited only as indicated in the appended claims.

What is claimed is:

1. An equilibrium apparatus of cut-off mechanism for a high-speed nut former comprising:
   a cutting unit including a first driven piece adapted to mount fixedly a cutting tool thereon and having a first gap provided in said driven piece, a first extension rod connected securely to said first driven piece, and a first roller mounted rotatably on said first driven piece within said first gap;
   a push plate drivable to effect straight reciprocating motion in a first direction and having a continuous push surface always abutting with said first roller for pushing said cutting unit to move in a second direction perpendicular to said first direction, said push surface including an planar intermediate portion located at a first level, two planar side portions located on the opposite sides of said planar intermediate portion at a second level different from said first level, and two slope portions each interconnecting said planar intermediate portion and one of said planar side portions;
   a counterweight unit, located parallel to said cutting unit, including a second driven piece carrying a counterweight thereon and having a second gap provided in said second driven piece, a second extension rod connected securely to said second driven piece, and a second roller mounted rotatably on said second driven piece within said second gap and always abutting with said push surface of said push plate so that said second driven piece is capable of being pushed by said push plate to move in said second direction, said second roller being located in a spaced relation with said first roller so that it is moved onto said planar intermediate portion of said push surface when said first roller is moved onto one of said planar side portions of said push surface and so that it is moved onto one of said planar side portions of said push surface when said first roller is moved onto said planar intermediate portion of said push surface;
   a coupler, mounted pivotally on the machine table of said nut former at the central portion thereof so that it can rotate about its pivoted point to movably interconnect said first and second extension rods at the opposite ends thereof in such a manner that said first and second extension rods are capable of effecting straight motion;
   a spring device disposed on said first and second extension rods for absorbing the shock produced from the cutting action of said cutting tool and for biasing said first and second extension rods to move in a third direction which is opposite to said second direction;
   whereby, when one of said cutting unit and said counterweight unit is pushed by said push plate to move in said second direction, the other of said cutting unit and said counterweight unit is moved stably in said third direction by said resilient device and said coupler, that is, said cutting unit and said counterweight unit are always pushed to effect straight reciprocating motion in opposite directions so that the equilibrium of said cut-off mechanism is achieved.

2. An equilibrium apparatus as claimed in claim 1, wherein said resilient device is a pair of laminated springs respectively disposed on said first and second extension rods.

* * * * *